(12) United States Patent
Okesaku

(10) Patent No.: US 11,993,314 B2
(45) Date of Patent: May 28, 2024

(54) UNDERBODY STRUCTURE OF VEHICLE

(71) Applicant: SUBARU CORPORATION, Tokyo (JP)

(72) Inventor: Yasuaki Okesaku, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 148 days.

(21) Appl. No.: 17/714,817

(22) Filed: Apr. 6, 2022

(65) Prior Publication Data

US 2022/0348268 A1 Nov. 3, 2022

(30) Foreign Application Priority Data

Apr. 28, 2021 (JP) ................................. 2021-076535

(51) Int. Cl.
*B62D 25/02* (2006.01)
*B62D 25/20* (2006.01)

(52) U.S. Cl.
CPC ....... *B62D 25/2036* (2013.01); *B62D 25/025* (2013.01)

(58) Field of Classification Search
CPC .. B62D 25/025; B62D 25/20; B62D 25/2009; B62D 25/2036
USPC .......... 296/209, 204, 193.07, 29, 30
See application file for complete search history.

(56) References Cited

U.S. PATENT DOCUMENTS

| 8,292,356 B2 * | 10/2012 | Ishigame | ........... B62D 25/2036 |
| | | | 296/193.07 |
| 10,946,903 B2 * | 3/2021 | Viaux | .................... B62D 21/03 |
| 2010/0156146 A1 * | 6/2010 | Matsuyama | ........... B62D 25/20 |
| | | | 296/193.07 |
| 2019/0009834 A1 | 1/2019 | Kageyama et al. | |

FOREIGN PATENT DOCUMENTS

JP 2019-014353 A 1/2019

* cited by examiner

*Primary Examiner* — Dennis H Pedder
(74) *Attorney, Agent, or Firm* — MCGINN I.P. LAW GROUP, PLLC

(57) ABSTRACT

An underbody structure of a vehicle includes a cross member, a side sill, and a gusset. The cross member is provided on a floor panel and extends in a vehicle width direction. The side sill is coupled to an outer end of the floor panel in the vehicle width direction and extends in a front-rear direction. The cross member and the side sill are separated in the vehicle width direction. The gusset is interposed between them. The gusset includes front and rear side walls, an upper wall, a protrusion, and front and rear flanges. Each side wall includes a lower end coupled to an outer end of the cross member in the vehicle width direction. The upper wall is coupled to an upper end of each side wall. The protrusion is provided at an outer end of the upper wall in the vehicle width direction.

18 Claims, 6 Drawing Sheets

UNDERBODY STRUCTURE OF VEHICLE

CROSS-REFERENCE TO RELATED APPLICATIONS

The present application claims priority from Japanese Patent Application No. 2021-076535 filed on Apr. 28, 2021, the entire contents of which are hereby incorporated by reference.

BACKGROUND

The disclosure relates to an underbody structure of a vehicle that includes a cross member provided on an upper surface of a floor panel and a side sill coupled to an end of the floor panel in a vehicle width direction.

An underbody structure of a vehicle generally includes a floor panel that is a floor of a vehicle body, a cross member provided on an upper surface of the floor panel and extending in a vehicle width direction, and a side sill coupled to an end of the floor panel in the vehicle width direction and extending in a front-rear direction (for example, see Japanese Unexamined Patent Application Publication (JP-A) No. 2019-14353). In the underbody structure described in JP-A No. 2019-14353, the cross member is coupled to the side sill via a seat-attaching bracket located on an outer side in the vehicle width direction. The seat-attaching bracket has a flange extending from an edge end on the outer side in the vehicle width direction. The flange is joined to a side surface of the side sill.

SUMMARY

An aspect of the disclosure provides an underbody structure of a vehicle. The underbody structure includes a cross member, a side sill, and a gusset. The cross member is provided on an upper surface of a floor panel. The cross member extends in a vehicle width direction of the vehicle. The side sill is coupled to an outer end of the floor panel in the vehicle width direction. The side sill extends in a front-rear direction of the vehicle. The cross member and the side sill are separated in the vehicle width direction. The gusset is interposed between the cross member and the side sill. The gusset includes a front side wall and a rear side wall in pairs, an upper wall, a protrusion, and a front flange and a rear flange in pairs. Each of the front side wall and the rear side wall includes a lower end coupled to an outer end of the cross member in the vehicle width direction. The upper wall is coupled to an upper end of each of the front side wall and an upper end of the rear side wall. The protrusion is provided at an outer end of the upper wall in the vehicle width direction. The protrusion protrudes outward in the vehicle width direction from the upper wall. The protrusion is joined to an upper part of the side sill. Each of the front flange and the rear flange extends from a predetermined position in a vertical direction of an outer end of a corresponding one of the front side wall and the rear side wall in the vehicle width direction to a predetermined position, in the vehicle width direction, of a lower end of the corresponding one of the front side wall and the rear side walls. Each of the front flange and the rear flange extends outward in the front-rear direction from the corresponding one of the front side wall and the rear side wall. Each of the front flange and the rear flange is coupled to (i) a side part of the side sill and (ii) the outer end of the cross member in the vehicle width direction.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

When a collision body collides with a side surface of the vehicle, the collision body comes into direct contact with the side sill of the vehicle body when the collision body is a utility pole or the like, and resistance is generated by the side sill, cross member, or the like. On the other hand, when the collision body is a vehicle or the like, the collision body comes into contact with a position higher than the side sill of the vehicle body at an initial stage of the collision. In this case, since the seat-attaching bracket is joined to the side surface of the side sill in the underbody structure described in JP-A No. 2019-14353, the seat-attaching bracket may not accurately support an upper part of the side sill. As a result, the side sill moves toward a vehicle interior relatively notably at the initial stage of the collision, and an intrusion amount of the collision body may not be sufficiently reduced.

It is desirable to provide an underbody structure capable of providing improved side collision performance regardless of a contact height of a collision body at the time of a side collision.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
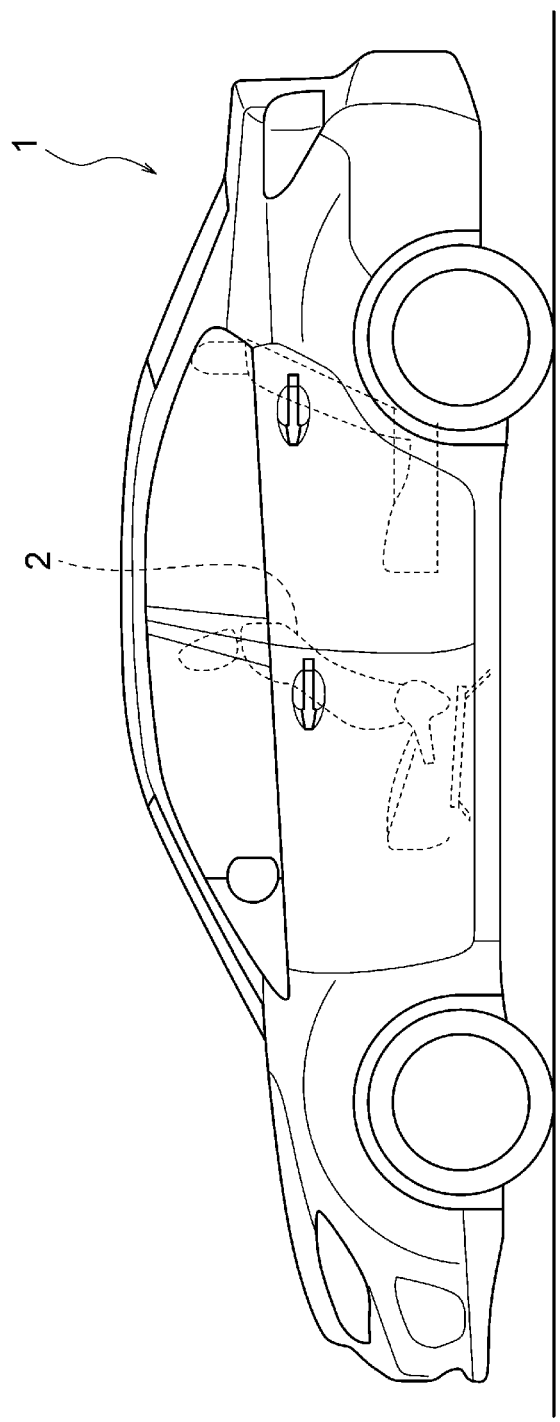
FIG. 1 is a side view of a vehicle according to an embodiment of the disclosure.
Figure 2:
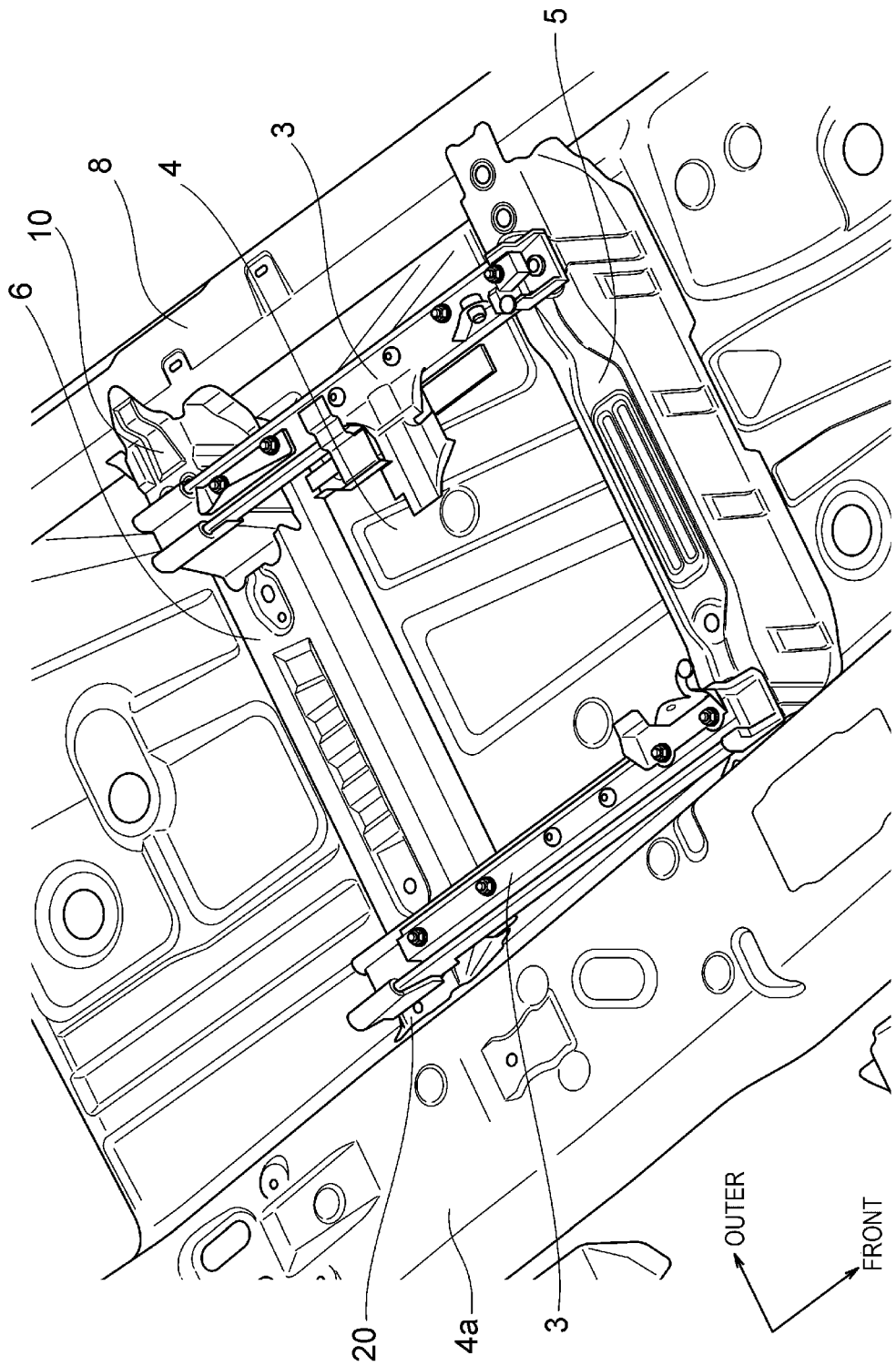
FIG. 2 is a perspective view of an underbody structure of the vehicle.
Figure 3:
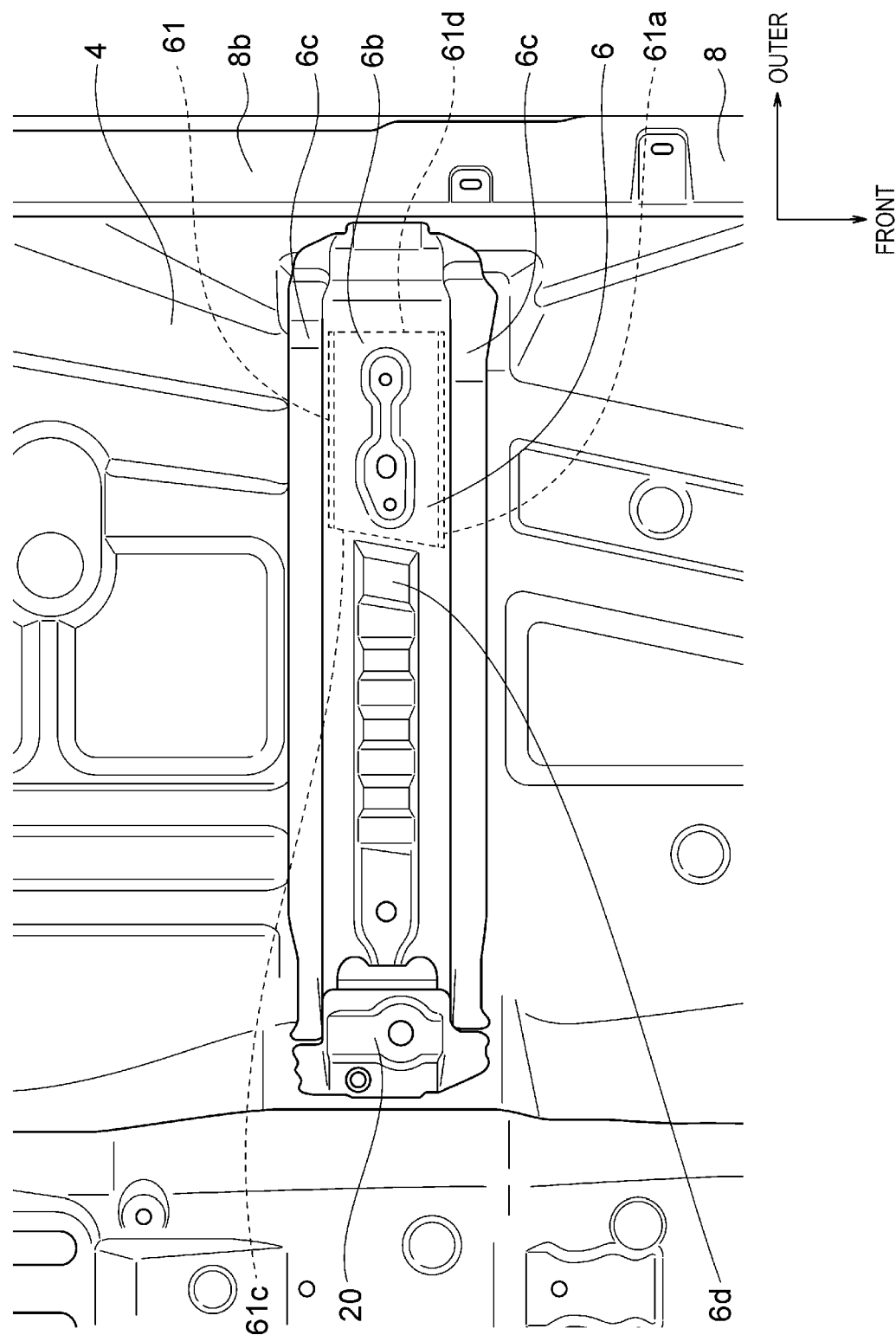
FIG. 3 is a plan view of the underbody structure when a gusset is removed.
Figure 4:
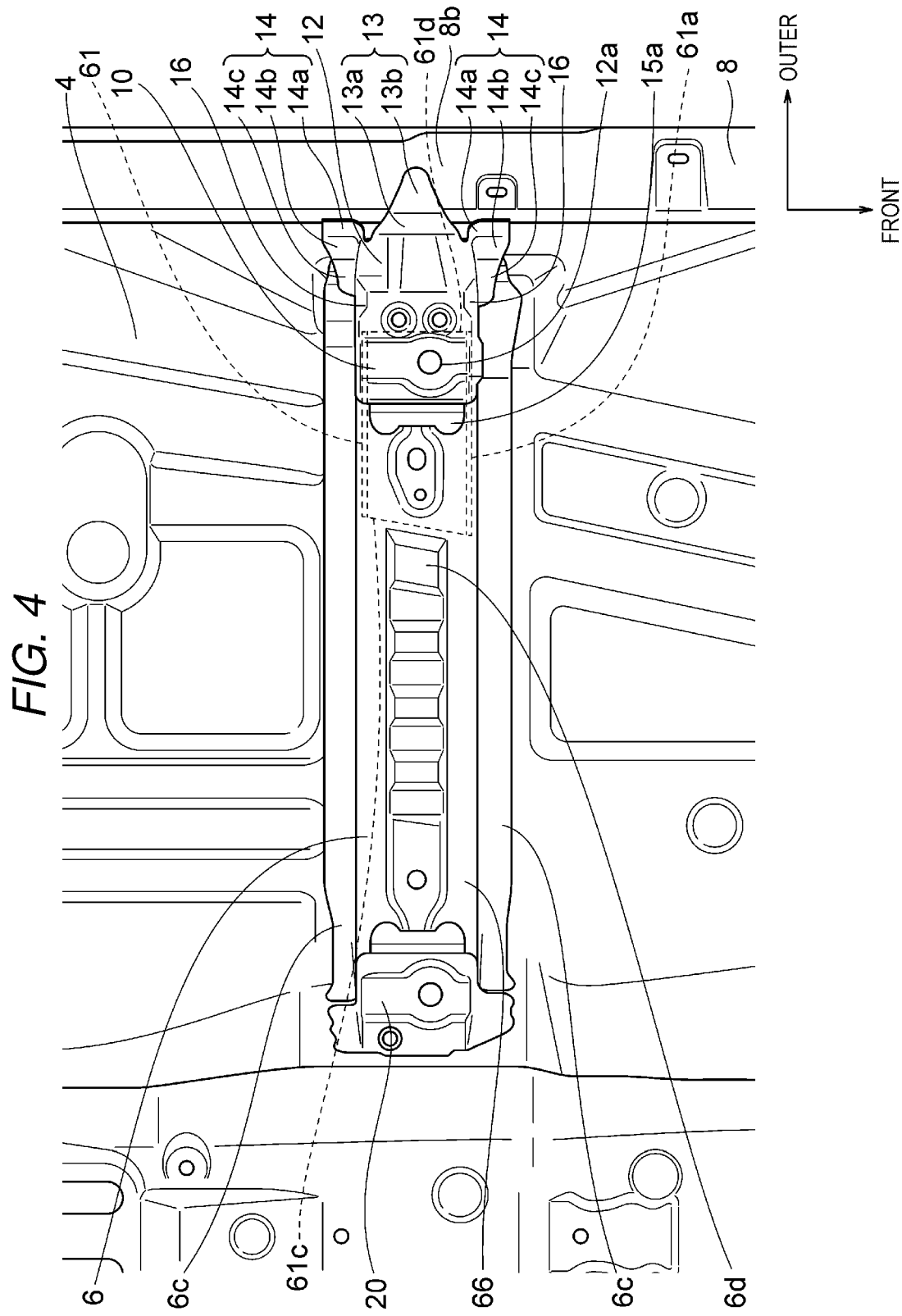
FIG. 4 is a plan view of the underbody structure when a seat rail is removed.
Figure 5:
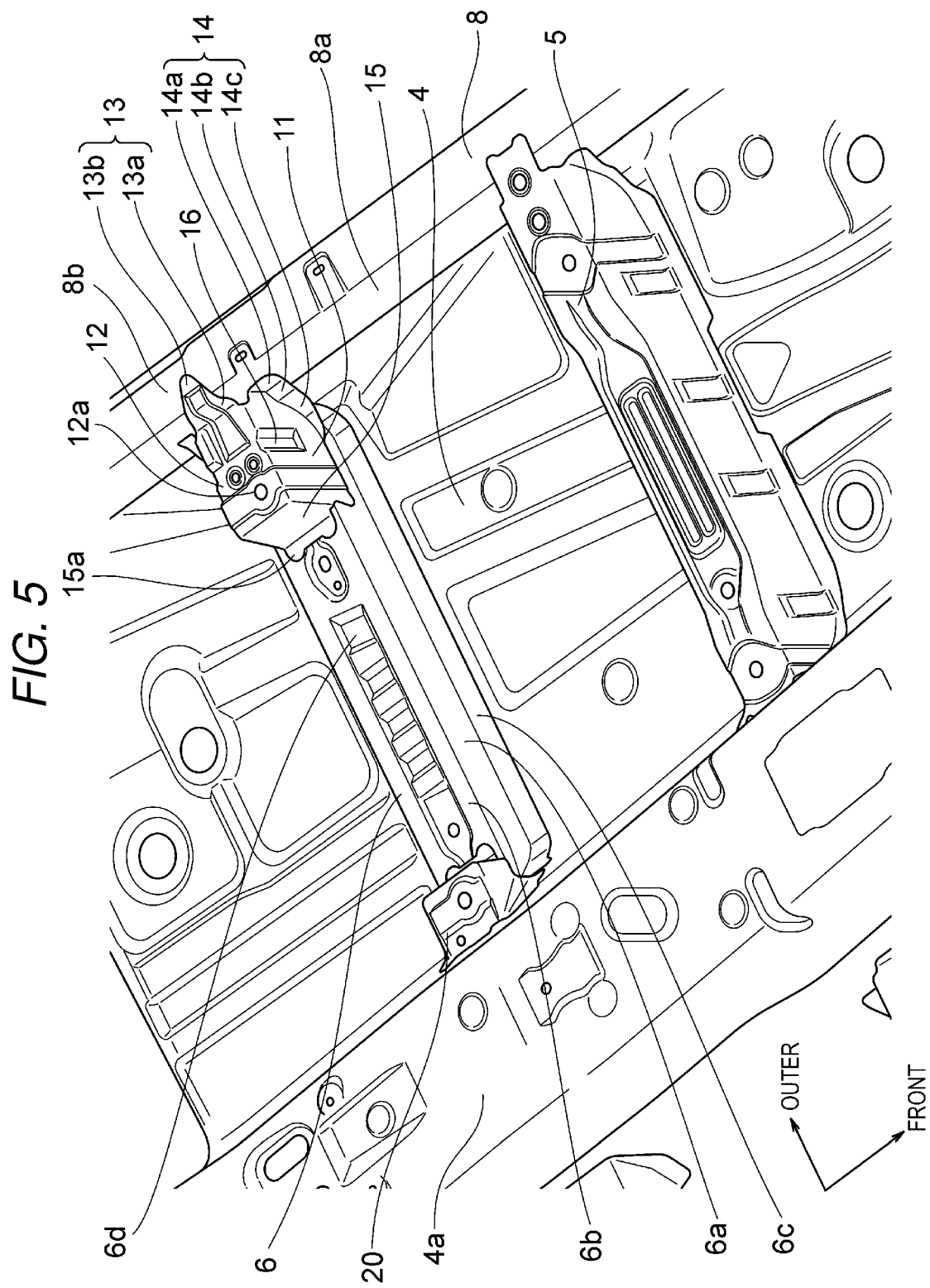
FIG. 5 is a perspective view of the underbody structure when the seat rail is removed.
Figure 6:
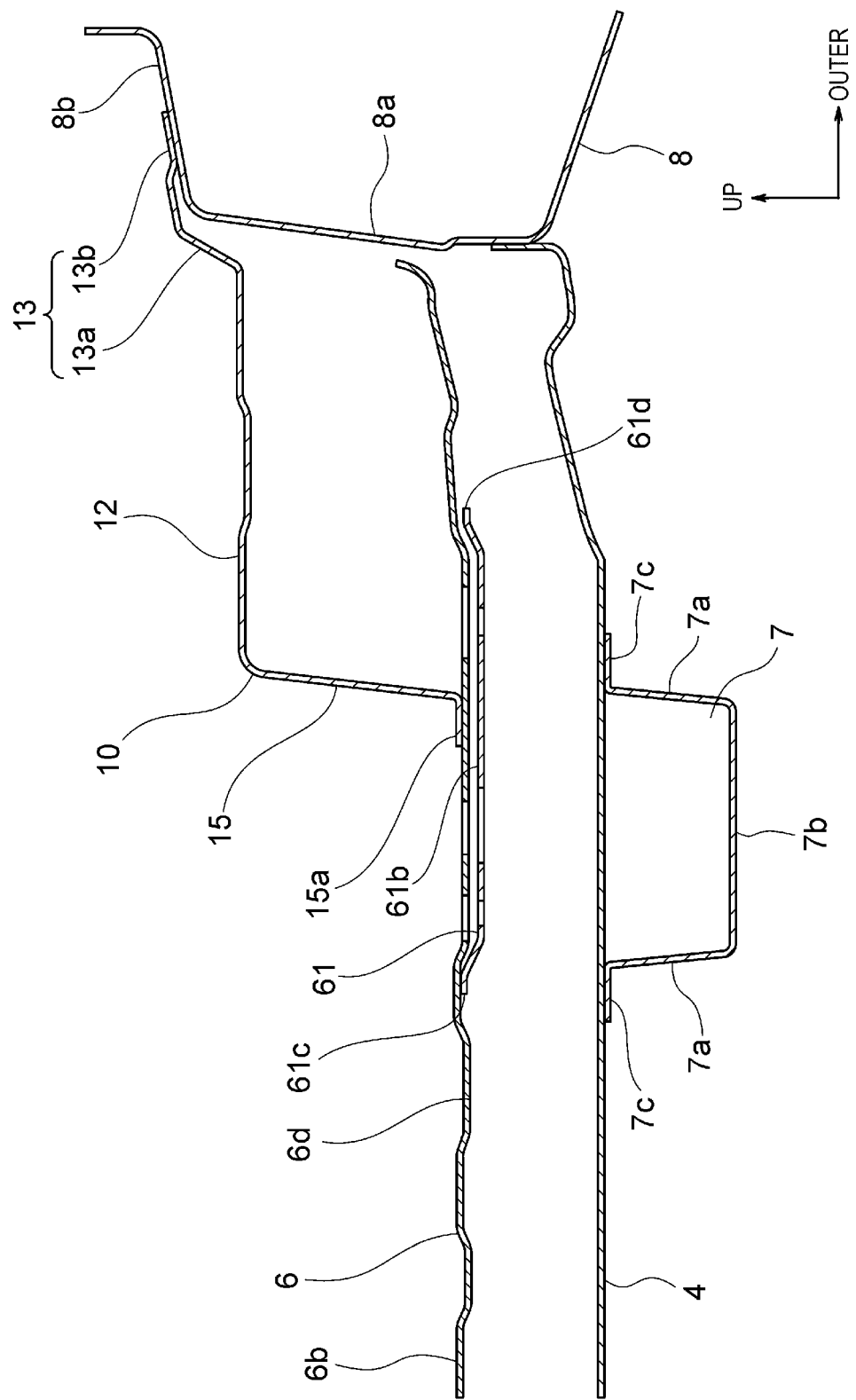
FIG. 6 is a front cross-sectional view of the underbody structure.

FIGS. 1 to 6 illustrate an embodiment of the disclosure. FIG. 1 is a side view of a vehicle according to the embodiment of the disclosure. FIG. 2 is a perspective view of an underbody structure of the vehicle. FIG. 3 is a plan view of the underbody structure when a gusset is removed. FIG. 4 is a plan view of the underbody structure when a seat rail is removed. FIG. 5 is a perspective view of the underbody structure when the seat rail is removed. FIG. 6 is a front cross-sectional view of the underbody structure.

As illustrated in FIG. 1, a vehicle 1 includes seats 2 in a vehicle interior. The seat 2 is fixed to a seat rail 3 (see FIG. 2), and is guided in a front-rear direction by the seat rail 3.

As illustrated in FIG. 2, a vehicle body structure of the vehicle 1 includes a floor panel 4 that is a floor of the vehicle body, a plurality of cross members 5, 6 provided on an upper surface of the floor panel 4 and extending in a vehicle width direction, a frame 7 (see FIG. 6) provided on a lower surface of the floor panel 4 and extending substantially in the front-rear direction, and a side sill 8 coupled to outer ends of the floor panel 4 in the vehicle width direction and extending in the front-rear direction. In the embodiment, the frame 7 extends rearward and obliquely outward in the vehicle width direction. In the embodiment, two cross members, including the first cross member 5 and the second cross member 6, are spaced from each other in the front-rear direction. The floor panel 4 includes a tunnel 4a on a center side in the vehicle width direction. The tunnel 4a protrudes upward and extends in the front-rear direction. Inner ends of the cross members 5, 6 in the vehicle width direction are coupled to the tunnel 4a. In the embodiment, the floor panel 4, the cross members 5, 6, the frame 7, and the side sill 8 are made of steel plates.

Each of the first cross member 5 and the second cross member 6 has a substantially hat shape protruding upward in a side cross section, and defines a closed cross section with the floor panel 4. In the embodiment, an outer end of the first cross member 5 in the vehicle width direction is coupled to the side sill 8, whereas the second cross member 6 is separated from the side sill 8 in the vehicle width direction and is not coupled to the side sill 8 as illustrated in FIG. 3. As illustrated in FIG. 4, the vehicle body structure of the vehicle 1 is provided with a gusset 10 interposed between the second cross member 6 and the side sill 8. As illustrated in FIG. 5, the gusset 10 has an upper end higher than the second cross member 6. The gusset 10 is attached to a rear end of the seat rail 3 on an outer side in the vehicle width direction as illustrated in FIG. 2. A rear end of the seat rail 3 on an inner side in the vehicle width direction is attached to a bracket 20. The bracket 20 is provided on an inner side of the second cross member 6 in the vehicle width direction.

As illustrated in FIG. 5, the gusset 10 includes a pair of front and rear side walls 11 having lower ends coupled to an outer end of the second cross member 6 in the vehicle width direction, an upper wall 12 that is coupled to upper ends of the side walls 11, a protrusion 13 provided at an outer end of the upper wall 12 in the vehicle width direction and coupled to the side sill 8, and a pair of front and rear flanges 14. The flanges 14 extend from predetermined positions in a vertical direction of outer ends of the side walls 11 in the vehicle width direction to predetermined positions in the vehicle width direction of lower ends of the side walls 11. The flanges 14 are coupled to the side sill 8 and the second cross member 6. The second cross member 6 includes a pair of front and rear side walls 6a, an upper wall 6b that is coupled to the side walls 6a, and a pair of front and rear flanges 6c extending outward in the front-rear direction from lower ends of the side walls 6a. The lower ends of the side walls 11 of the gusset 10 are coupled respectively to the side walls 6a of the second cross member 6. The side walls 11 of the gusset 10 extend upward from parts where the side walls 11 of the gusset 10 are coupled to the side walls 6a of the second cross member 6. The upper wall 12 of the gusset 10 is disposed at a position higher than the upper wall 6b of the second cross member 6. The upper wall 12 of the gusset 10 includes a seat-attaching part 12a with which the seat rail 3 is attached. The gusset 10 is used for attachment of the seat 2. In the embodiment, the seat-attaching part 12a is provided near an inner end of the upper wall 12 in the vehicle width direction.

Further, the gusset 10 includes a blocking wall 15 blocking a virtual opening defined by (i) inner ends of the side walls 11 in the vehicle width direction, (ii) an inner end of the upper wall 12 in the vehicle width direction, and (iii) the upper wall 6b of the cross member 6. With this structure, deformation of the gusset 10 in a side cross section is prevented, and the rigidity and strength of the gusset 10 can be increased. The blocking wall 15 includes, at a lower end, a flange 15a extending inward in the vehicle width direction and joined to the upper wall 6b of the second cross member 6. As illustrated in FIG. 6, the blocking wall 15 overlaps an outer end of the frame 7 in the vehicle width direction in a plan view. The frame 7 includes a pair of left and right side walls 7a, a lower wall 7b that is coupled to the side walls 7a, and a pair of left and right flanges 7c extending outward in a left-right direction from upper ends of the side walls 7a. In the embodiment, the blocking wall 15 overlaps the flange 7c on an outer side of the frame 7 in the vehicle width direction in a plan view.

Further, the second cross member 6 includes a bead 6d on a center side of the upper wall 6b in the front-rear direction. The bead 6d corresponds to the side wall 7a on an inner side of the frame 7 in the vehicle width direction. The bead 6d extends in an extending direction of the frame 7. An outer end of the bead 6d in the vehicle width direction overlaps the flange 7c on the inner side of the frame 7 in the vehicle width direction in a plan view. In the embodiment, the bead 6d is recessed on the upper wall 6b of the second cross member 6.

Further, in the embodiment, a reinforcing member 61 is provided in a closed cross section defined by the second cross member 6 and the floor panel 4. The reinforcing member 61 includes a pair of front and rear side walls 61a and an upper wall 61b that is coupled to the side walls 61a. The side walls 61a of the reinforcing member 61 are joined respectively to the side walls 6a of the second cross member 6. The upper wall 61b of the reinforcing member 61 is joined to the upper wall 6b of the second cross member 6. In the reinforcing member 61, an inner end 61c of the upper wall 61b in the vehicle width direction corresponds to the side wall 7a on the inner side of the frame 7 in the vehicle width direction. An outer end 61d of the upper wall 61b in the vehicle width direction corresponds to each of beads 16 (which will be described later) of the gusset 10. The inner end 61c of the upper wall 61b in the vehicle width direction extends in the extending direction of the frame 7. The outer end 61d of the upper wall 61b in the vehicle width direction extends in the front-rear direction. The inner end 61c of the upper wall 61b in the vehicle width direction overlaps the flange 7c on the inner side of the frame 7 in the vehicle width direction in a plan view. Further, the outer end 61d of the upper wall 61b in the vehicle width direction is disposed outwardly of the flange 7c on the outer side of the frame 7 in the vehicle width direction.

The protrusion 13 of the gusset 10 protrudes outward in the vehicle width direction from the upper wall 12 and is joined to an upper part of the side sill 8. The side sill 8 includes an inner wall 8a on an inner side in the vehicle width direction, an outer wall on an outer side in the vehicle width direction, an upper wall 8b that is coupled to an upper end of the inner wall 8a and an upper end of the outer wall, and a lower wall that is coupled to a lower end of the inner wall 8a and a lower end of the outer wall. The outer wall and the lower wall are not illustrated. In the embodiment, the protrusion 13 is joined to the upper wall 8b of the side sill 8. The upper wall 12 of the gusset 10 is disposed at a position lower than the upper wall 8b of the side sill 8. In the embodiment, the protrusion 13 includes an upward extending part 13a extending upward from the outer end of the upper wall 12 in the vehicle width direction and inclined outward in the vehicle width direction, and a joining part 13b extending outward in the vehicle width direction from an upper end of the upward extending part 13a and joined to the upper wall 8b of the side sill 8.

Each of the flanges 14 of the gusset 10 extends outward in the front-rear direction from a respective one of the side walls 11 and is joined to the inner wall 8a of the side sill 8 and a respective one of the flanges 6c of the second cross member 6. Each of the flanges 14 includes a side sill joining part 14a, an intermediate part 14b, and a cross member joining part 14c in order from an outer end in the vehicle width direction. The side sill joining part 14a is provided along the inner wall 8a of the side sill 8, and is joined to the inner wall 8a by spot welding.

As illustrated in FIG. 5, an outer end, in the vehicle width direction, of each of the flanges 6c of the second cross member 6 is separated from the floor panel 4. In one example, the outer ends, in the vehicle width direction, of the flanges 6c of the second cross member 6 extend outward in the vehicle width direction and are curved upward so as to be obliquely downward convex in a front view. The cross member joining part 14c of each of the flanges 14 of the gusset 10 is provided along a respective one of the flanges 6c of the second cross member 6, and is joined to the respective one of the flanges 6c of the second cross member 6 by spot welding. The intermediate part 14b of each of the flanges 14 of the gusset 10 is continuous with the side sill joining part 14a and the cross member joining part 14c, and is smoothly coupled to the side sill joining part 14a and the cross member joining part 14c. In the embodiment, the flanges 14 of the gusset 10 have a curved surface shape. The flanges 14 of the gusset 10 extend from the uppermost parts at the outer ends of the side walls 11 in the vehicle width direction to positions at the lower ends of the side walls 11 where the flanges 6c of the second cross member 6 separate from the floor panel 4.

The gusset 10 further includes the beads 16 disposed in the side walls 11 and extending in the vertical direction. The beads 16 are disposed between the joining part 13b of the protrusion 13 joined to the side sill 8 and the seat-attaching part 12a of the upper wall 12, in the vehicle width direction. In the embodiment, a pair of front and rear beads 16 are disposed on the outer side, in the vehicle width direction, of the outer end 61d of the reinforcing member 61 in the vehicle width direction.

According to the vehicle body structure configured as described above, when a collision body such as another vehicle collides with a side surface of the vehicle and the collision body comes into contact with a position higher than the side sill of the vehicle body, the upper part of the side sill 8 can be supported by the gusset 10, and the side sill 8 can be prevented from moving toward the vehicle interior.

On the other hand, when a collision body such as a utility pole collides with the side surface of the vehicle and the collision body comes into contact with the side sill 8 of the vehicle body, the gusset 10 is crushed in the vehicle width direction so that necessary resistance can be generated. In the embodiment, the gusset 10 can be crushed from the beads 16 as start points. As a result, it is possible to accurately set a deformation mode and resistance of the gusset 10 in a side collision.

At this time, the frame 7 is relatively firm and is thus less likely to be crushed than the other parts, whereas parts of the vehicle body disposed outwardly of the frame 7 in the vehicle width direction is likely to be crushed. Therefore, the blocking wall 15 located at the inner end of the gusset 10 in the vehicle width direction overlaps the outer end of the frame 7 in the vehicle width direction, so that the entire gusset 10 is located in a region where the gusset 10 is easily crushed in a side collision. As a result, the gusset 10 can efficiently absorb energy. Further, the second cross member 6 is bent at a position of the inner end 61c of the reinforcing member 61 in the vehicle width direction, so that the second cross member 6 can be bent while avoiding the frame 7 that is not easily deformed. In the embodiment, the bead 6d of the upper wall 6b of the second cross member 6 also overlaps the side wall 7a on the inner side of the frame 7 in the vehicle width direction, so that a bending mode of the second cross member 6 can be accurately controlled. As a result, the second cross member 6 can efficiently absorb energy from a side collision.

Further, as described in the above embodiment, the seat rail 3 is fixed to the gusset 10. Alternatively, the gusset 10 may be provided independently of the seat 2. In the embodiment, the blocking wall 15 of the gusset 10 overlaps the outer end of the frame 7 in the vehicle width direction. Alternatively, a position of the blocking wall 15 in the vehicle width direction can be freely changed. The blocking wall 15 may not be provided.

Further, as described in the above embodiment, each of the flanges 6c of the second cross member 6 is separated from the floor panel 4 at the outer end in the vehicle width direction. Alternatively, the second cross member 6 may have any shape, and each of the flanges 6c is not necessarily separated from the floor panel 4 at the outer end in the vehicle width direction. The second cross member 6 may have any shape as long as the flanges 14 of the gusset 10 are coupled to the second cross member 6 and the side sill 8.

In the above embodiment, the joining part 13b of the protrusion 13 of the gusset 10 joined to the side sill 8 extends from the up13a. However, the joining part 13b does not necessarily extend from the upward extending part 13a. The protrusion 13 may simply be coupled to the upper part of the side sill 8. A shape or the like of the protrusion 13 can be appropriately changed according to a relative height or the like between the upper wall 12 of the gusset 10 and the upper part of the side sill 8.

As described in the above embodiment, the beads 16 are provided on both side walls 11 of the gusset 10. Alternatively, the beads 16 may be provided simply on one side wall 11. In addition, a plurality of beads 16 may be provided on each of the side walls at an interval in the vehicle width direction. The beads 16 may also be omitted.

The embodiment of the disclosure has been described above. It is noted that the above embodiment does not limit the claimed invention. Further, it is noted that all combinations of features described in the embodiment are not necessary to solve a problem of the disclosure.

According to the underbody structure of the vehicle of the embodiment, the cross member and the side sill are coupled to each other via the gusset, the upper part of the side sill is coupled to the protrusion of the gusset, and a side part of the side sill is coupled to the flanges of the gusset. Accordingly, when a collision body such as another vehicle collides with a side surface of the vehicle and the collision body comes into contact with a position higher than the side sill of the vehicle body, the upper part of the side sill can be supported by the gusset and be prevented from moving toward the vehicle interior. On the other hand, when a collision body such as a utility pole collides with the side surface of the vehicle and the collision body comes into contact with the side sill of the vehicle body, the gusset is crushed in the vehicle width direction, so that necessary resistance can be generated.

According to the underbody structure of the vehicle of the embodiment, the virtual opening defined by (i) the side walls of the gusset, (ii) the upper wall of the gusset, and (iii) the upper part of the cross member is blocked. Accordingly, deformation of the gusset in a side cross section is prevented, and the rigidity and strength of the gusset can be increased.

According to the underbody structure of the vehicle of the embodiment, the frame is relatively firm against a side collision of the vehicle, and is thus less likely to be crushed than the other parts, whereas a part of the vehicle body on an outer side of the frame in the vehicle width direction is likely to be crushed. Therefore, the blocking wall located at the inner end of the gusset in the vehicle width direction overlaps the outer end of the frame in the vehicle width direction, so that the entire gusset is located in a region where the gusset is easily crushed in a side collision. As a result, the gusset can efficiently absorb energy.

According to the underbody structure of the vehicle of the embodiment, the gusset can be used for attachment of the seat.

According to the underbody structure of the vehicle of the embodiment, the gusset can be crushed from the bead as a start point in a side collision of the vehicle. As a result, it is possible to accurately set a deformation mode and resistance of the gusset in a side collision.

According to the underbody structure of the vehicle of the embodiment of the disclosure, improved side collision performance can be achieved regardless of a contact height of a collision body in a side collision.

The invention claimed is:

1. An underbody structure of a vehicle, the underbody structure comprising:
   a cross member provided on an upper surface of a floor panel, the cross member extending in a vehicle width direction of the vehicle;
   a side sill coupled to an outer end of the floor panel in the vehicle width direction, the side sill extending in a front-rear direction of the vehicle; and
   a gusset,
   wherein the cross member and the side sill are separated in the vehicle width direction,
   wherein the gusset is interposed between the cross member and the side sill, and
   wherein the gusset includes:
      a front side wall and a rear side wall in pairs, each of the front side wall and the rear side wall comprising a lower end coupled to an outer end of the cross member in the vehicle width direction;
      an upper wall that coupled to an upper end of each of the front side wall and an upper end of the rear side wall;
      a protrusion provided at an outer end of the upper wall in the vehicle width direction, the protrusion protruding outward in the vehicle width direction from the upper wall; and
      a front flange and a rear flange in pairs, each of the front flange and the rear flange extending from a predetermined position in a vertical direction of an outer end of a corresponding one of the front side wall and the rear side wall in the vehicle width direction to a predetermined position in the vehicle width direction of a lower end of the corresponding one of the front side wall and the rear side walls, each of the front flange and the rear flange extending outward in the front-rear direction from the corresponding one of the front side wall and the rear side wall, each of the front flange and the rear flange being coupled to (i) a side part of the side sill and (ii) the outer end of the cross member in the vehicle width direction,
   wherein the protrusion of the gusset includes:
      an upward extending part that extends upward from an outer end of the upper wall in the vehicle width direction and that is inclined outward in the vehicle width direction; and
      a joining part extending outward in the vehicle width direction from an upper end of the upward extending part and that is joined to an upper wall of the side sill, and a U shaped reinforcement within the cross member and below the gusset.

2. The underbody structure according to claim 1, wherein the gusset comprises a blocking wall blocking a virtual opening defined by (i) an inner end of each of the front side wall and rear side wall in the vehicle width direction, (ii) an inner end of the upper wall in the vehicle width direction, and (iii) an upper part of the cross member.

3. The underbody structure according to claim 2, further comprising:
   a frame defining a closed cross section with the floor panel, the frame extending substantially in the front-rear direction, wherein
   the blocking wall of the gusset overlaps an outer end of the frame in the vehicle width direction in a plan view of the vehicle.

4. The underbody structure according to claim 1, wherein the gusset comprises a seat-attaching part on the upper wall.

5. The underbody structure according to claim 2, wherein the gusset comprises a seat-attaching part on the upper wall.

6. The underbody structure according to claim 3, wherein the gusset comprises a seat-attaching part on the upper wall.

7. The underbody structure according to claim 4, wherein
   the gusset comprises a bead in at least one of the front side wall and the rear side wall,
   the bead is disposed, in the vehicle width direction, between the seat-attaching part and a part of the protrusion where the protrusion is coupled to the side sill, and
   the bead extends in the vertical direction.

8. The underbody structure according to claim 5, wherein
   the gusset comprises a bead in at least one of the front side wall and the rear side wall,
   the bead is disposed, in the vehicle width direction, between the seat-attaching part and a part of the protrusion where the protrusion is coupled to the side sill, and
   the bead extends in the vertical direction.

9. The underbody structure according to claim 6, wherein
   the gusset comprises a bead in at least one of the front side wall and the rear side wall,
   the bead is disposed, in the vehicle width direction, between the seat-attaching part and a part of the protrusion where the protrusion is coupled to the side sill, and
   the bead extends in the vertical direction.

10. The underbody structure according to claim 1, wherein the cross member includes a substantially hat shape protruding upward in a side cross section, and defines a closed cross section with the floor panel.

11. The underbody structure according to claim 1, further comprising a seat rail,
wherein the gusset is attached to a rear end of the seat rail on an outer side in the vehicle width direction.

12. The underbody structure according to claim 1, further comprising a seat rail,
wherein the gusset is attached to a rear end of the seat rail on an outer side in the vehicle width direction.

13. The underbody structure according to claim 1, further comprising a seat rail,
wherein the gusset is attached, via the seat-attaching part, to a rear end of the seat rail on an outer side in the vehicle width direction.

14. The underbody structure according to claim 1, further comprising a reinforcing member provided in a closed cross section defined by the cross member and the floor panel.

15. The underbody structure according to claim 14, wherein the reinforcing member includes:
a pair of front and rear side walls; and
an upper wall that is coupled to the side walls,
wherein the side walls of the reinforcing member are joined respectively to a side walls of the cross member 6, and
wherein the upper wall of the reinforcing member is joined to an upper wall of the cross member.

16. The underbody structure according to claim 1, wherein the upward extending part of the protrusion is separating from the side sill.

17. The underbody structure according to claim 1, wherein each of the front flange and the rear flange are separated from the floor panel.

18. An underbody structure of a vehicle, the underbody structure comprising:
a cross member provided on an upper surface of a floor panel, the cross member extending in a vehicle width direction of the vehicle;
a side sill coupled to an outer end of the floor panel in the vehicle width direction, the side sill extending in a front-rear direction of the vehicle; and
a gusset,
wherein the cross member and the side sill are separated in the vehicle width direction,
wherein the gusset is interposed between the cross member and the side sill,
wherein the gusset includes:
a front side wall and a rear side wall in pairs, each of the front side wall and the rear side wall comprising a lower end coupled to an outer end of the cross member in the vehicle width direction;
an upper wall that coupled to an upper end of each of the front side wall and an upper end of the rear side wall;
a protrusion provided at an outer end of the upper wall in the vehicle width direction, the protrusion protruding outward in the vehicle width direction from the upper wall; and
a front flange and a rear flange in pairs, each of the front flange and the rear flange extending from a predetermined position in a vertical direction of an outer end of a corresponding one of the front side wall and the rear side wall in the vehicle width direction to a predetermined position in the vehicle width direction of a lower end of the corresponding one of the front side wall and the rear side walls, each of the front flange and the rear flange extending outward in the front-rear direction from the corresponding one of the front side wall and the rear side wall, each of the front flange and the rear flange being coupled to (i) a side part of the side sill and (ii) the outer end of the cross member in the vehicle width direction, and
wherein each of the front flange and the rear flange are separated from the floor panel, and a U shaped reinforcement within the cross member and below the gusset.

* * * * *